United States Patent
Haviv (10) Patent No.: US 7,346,702 B2
(45) Date of Patent: Mar. 18, 2008

(54) SYSTEM AND METHOD FOR HIGHLY SCALABLE HIGH-SPEED CONTENT-BASED FILTERING AND LOAD BALANCING IN INTERCONNECTED FABRICS

(75) Inventor: Yaron Haviv, Zoran (IL)

(73) Assignee: Voltaire Ltd., Hertzlia (IL)

( * ) Notice: Subject to any disclaimer, the term of this patent is extended or adjusted under 35 U.S.C. 154(b) by 625 days.

(21) Appl. No.: 09/934,535

(22) Filed: Aug. 23, 2001

(65) Prior Publication Data

US 2002/0059451 A1    May 16, 2002

Related U.S. Application Data (60) Provisional application No. 60/227,362, filed on Aug. 24, 2000.

(51) Int. Cl.
*G06F 15/173* (2006.01)
*G06F 15/00* (2006.01)

(52) U.S. Cl. .................. 709/238; 709/212; 718/105

(58) Field of Classification Search ............. 709/229, 709/226, 235, 203, 330, 238, 227, 212, 250; 370/412, 400; 718/105
See application file for complete search history.

(56) References Cited

U.S. PATENT DOCUMENTS

| | | | |
|---|---|---|---|
| 5,995,503 A | | 11/1999 | Crawley et al. |
| 6,005,860 A | | 12/1999 | Anderson et al. |
| 6,006,264 A | | 12/1999 | Colby et al. |
| 6,067,580 A | * | 5/2000 | Aman et al. ............ 719/330 |
| 6,151,688 A | * | 11/2000 | Wipfel et al. ............ 714/48 |
| 6,226,684 B1 | * | 5/2001 | Sung et al. ............ 709/238 |
| 6,292,489 B1 | | 9/2001 | Fukushima et al. |
| 6,333,929 B1 | * | 12/2001 | Drottar et al. ............ 370/362 |
| 6,360,220 B1 | * | 3/2002 | Forin ............ 707/8 |
| 6,370,381 B1 | | 4/2002 | Minnick et al. |
| 6,389,017 B1 | * | 5/2002 | Patel et al. ............ 370/389 |
| 6,389,448 B1 | | 5/2002 | Primak et al. |
| 6,493,348 B1 | * | 12/2002 | Gelman et al. ............ 370/401 |
| 6,594,712 B1 | * | 7/2003 | Pettey et al. ............ 710/22 |
| 6,640,239 B1 | * | 10/2003 | Gidwani ............ 709/203 |
| 6,647,423 B2 | * | 11/2003 | Regnier et al. ............ 709/229 |
| 6,697,878 B1 | * | 2/2004 | Imai ............ 719/316 |
| 6,735,205 B1 | * | 5/2004 | Mankude et al. ............ 370/395.32 |
| 6,742,051 B1 | * | 5/2004 | Bakshi et al. ............ 719/318 |
| 6,779,017 B1 | * | 8/2004 | Lamberton et al. ............ 709/203 |
| 6,788,692 B1 | * | 9/2004 | Boudreau et al. ............ 370/400 |
| 7,010,607 B1 | * | 3/2006 | Bunton ............ 709/228 |
| 2001/0049740 A1 | * | 12/2001 | Karpoff ............ 709/231 |
| 2003/0046474 A1 | * | 3/2003 | Craddock et al. ............ 710/308 |
| 2003/0195983 A1 | * | 10/2003 | Krause ............ 709/238 |

OTHER PUBLICATIONS

Shirish Sathaye, Layer 4 switching: Is it worth the hype?, Feb. 8, 1999, www.nwfusion.com.*

(Continued)

*Primary Examiner*—Zarni Maung
(74) *Attorney, Agent, or Firm*—EMPK & Shiloh, LLP (57) ABSTRACT

In some embodiments of the present invention, a system includes one or more server computers having multi-channel reliable network hardware and a proxy. The proxy is able to receive packet-oriented traffic from a client computer, to convert a session of the packet-oriented traffic into transactions, and to send the transactions to one of the server computers. The transactions include remote direct memory access messages.

32 Claims, 4 Drawing Sheets

OTHER PUBLICATIONS

Neal Weinberg, Layer 4 switch summit, Jan. 31, 2000, www.nwfusion.com.*

Cisco Systems Inc., White Paper, Policy-Based Routing, 1996, http://www.cisco.com/warp/public/732/Tech/routing/pbr/.*

* cited by examiner

SYSTEM AND METHOD FOR HIGHLY SCALABLE HIGH-SPEED CONTENT-BASED FILTERING AND LOAD BALANCING IN INTERCONNECTED FABRICS

CROSS-REFERENCE TO RELATED APPLICATIONS

The present application claims priority from U.S. provisional application Ser. No. 60/227,362, filed Aug. 24, 2000.

BACKGROUND OF THE INVENTION

Current technologies of network traffic enable transmitting of data between computer devices at a data rate of more than one gigabyte per second. However, in existing systems for content filtering and load-balancing, all the network traffic travels through a single input/output port, thus creating a single point of failure and negatively impacting performance. While inspecting and filtering traffic, such systems may divert the traffic to one of a plurality of servers according to their load. These systems usually work with transmission control protocol (TCP) and Internet protocol (IP) and follow the communication state for each session in order to achieve acceptable content filtering and load-balancing.

This procedure consumes a lot of processing power and is suitable mainly for well-known simple protocols such as hypertext transfer protocol (HTTP) and file transfer protocol (FTP). The method usually inserts a delay into the transactions and involves redundant communication processing. The existing methods are not suitable for managing load-balancing and fail-over procedure of remote procedure call (RPC), storage traffic, database traffic, and heavy traffic loads. In case of a failure, the procedure of a rollback and retransmit to another machine may not be available. Moreover, when the communication is disconnected, there is no knowledge which parts of the intended traffic have reached the destination prior to the disconnection.

There is a demand for efficient high-availability content filtering technologies having better performances and using less central processing unit (CPU) resources.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits have not been described in detail so as not to obscure the present invention.

Some embodiments of the present invention are directed to a system that enables filtered peer-to-peer communication with improved performance and load-balancing and fail-over mechanisms. The system, which will be described with respect to FIG. 1, enables one or more routers, coupled to one or more client computers and to one or more server computers, to receive transactions. The system also enables the data associated with that transaction to travel directly between the server and the client in a secured and efficient manner.

In some embodiments, the system may be implemented in an efficient multi-channel reliable network having remote direct memory access (RDMA) capabilities. RDMA is a capability that allows data to be sent directly from one computer to the memory of another computer. The processing unit of the receiving computer is freed from involvement with the data transfer, thus speeding up overall computer operation. Non-limiting examples of an efficient multi-channel reliable network include new system area network (SAN), InfiniBand network, Fiber-Channel network, asynchronous transfer mode (ATM) network and RDMA over TCP/IP network. These networks may be termed in general as "interconnects".

In other embodiments of the present invention, a transaction-aware communication software implementation may provide the requested functionality. For example, the software may be a kernel software element that may receive RDMA requests and may emulate the RDMA operation (e.g moving memory blocks to and from the requestor) without higher-level layers and/or the application.

In some cases, it may not be possible to replace the client networking software and/or hardware. In such cases, according to some embodiments of the present invention that will be described with respect to FIG. 4, a proxy element may be added between the router or routers and the client computers. The proxy may collect packets provided by the client (e.g. TCP/IP packets) and may generate transactions instead of the client computer. The proxy may also convert the result data back to packets.

Figure 1:
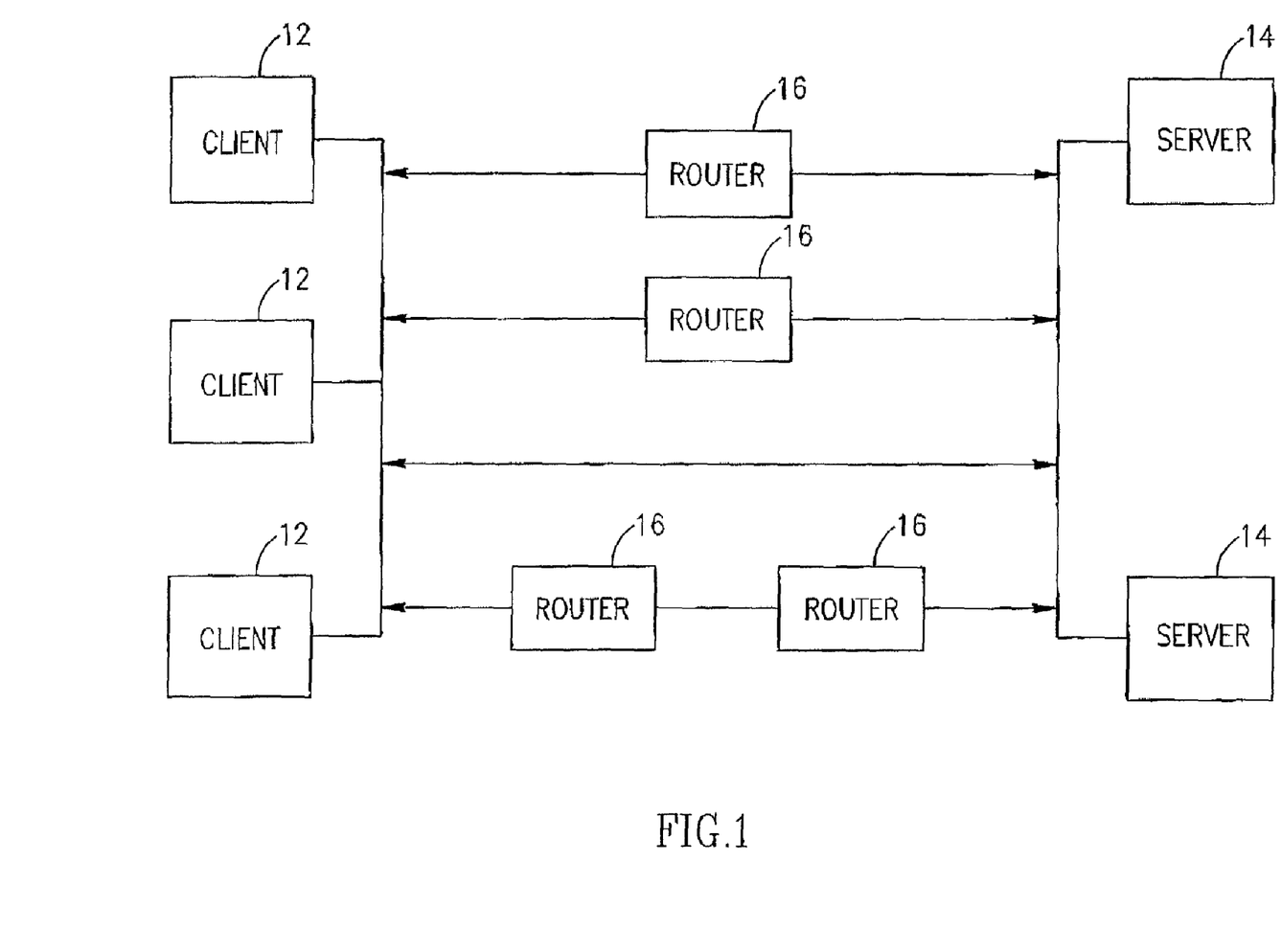
FIG. 1 is a block diagram illustration of a content filtering and load balancing system according to some embodiments of the present invention.

Reference is now made to FIG. 1, which is a block diagram illustration of a system for content filtering and load balancing according to some embodiments of the present invention. Throughout the description, the term "content filtering" refers to operations, such as, for example, security, caching, accounting, quality of service and others.

System 10 may comprise at least one client computer 12, at least one server computer 14 and at least one router 16 coupled to client computer 12 and to server computer 14.

Throughout the description and claims, the term "client computer" refers to a computer initiating a transaction (e.g. web server) and the term "server computer" refers to a computer processing the transaction (e.g. database or a storage device). A computer may be simultaneously a client computer 12 for some applications and a server computer 14 for other applications. Router 16 may be implemented as a software package, an embedded device, an electronic device, and any combination thereof. Routers 16 may be implemented in parallel, serially, in a cascaded manner and any combination thereof.

System 10 may be implemented in an RDMA network environment using protocols such as, for example, socket direct protocol (SDP), direct access file system (DAFS), and SCSI RDMA protocol (SRP) over technologies such as, for example VI and Infiniband. System 10 may also be implemented in a standard TCP/IP network environment by expanding TCP/IP protocols to support RDMA. System 10 may integrate a lightweight software implementation that may provide the functionality of RDMA without using special hardware on top of existing networks. For example, implementing a kernel software element that may receive RDMA requests and may emulate the RDMA operation (moving memory blocks to and from the requestor) without involving the higher-level layers and/or the application.

There may be several routers having similar or different functionality to increase availability, capacity, and functionality and to share the load. Router 16 may be remotely managed. Router 16 may be secured to reduce its vulnerability to outside attacks. The system may be implemented in a local area network and server environment as well as in wide area networks.

Router 16 may be adapted to manage content filtering and routing according to a predefined policy. System 10 may comprise several cascaded routers having at least one filter from a group including security filters, caching filters, accounting filters, and quality of service filters. Router 16 may filter transactions and may route the filtered transactions to one of server computers 14 or to another router 16 for additional filtering. Router 16 may be further adapted to manage the load balancing. Router 16 may select a server computer for command processing based on, for example, momentary availability, load information, quality of service, and others.

In existing content filtering systems, all the traffic between the client and the server is transferred via the router. In contrast, according to some embodiments of the present invention, router 16 may receive and process only part of each transaction (i.e. the command) or alternatively router 16 may receive and process only the connection request. The processing of the connection request may involve selecting server 14 according to information in the connection request. This information may comprise opaque data that is not used by the communication protocol. The main part of the transaction (i.e. the data) may travel directly between client 12 and server 14 in a secure manner using efficient peer-to-peer operations that do not consume a lot of CPU resources. Alternatively, the data may travel via router 16 without being processed. Router 16 may decide to divert the transaction to other servers in case of load, failure or based on the traffic content.

Many applications use transactions, such as, for example, RPC applications, database applications, storage-access applications, and file-access applications. A transaction is a two-way communication comprising sending a command and receiving a result or requested data. In many applications, there is no need to inspect the received data, which is provided by a trusted machine. Sometimes there is no need even to inspect some of the command's parameters.

In some applications, transactions are stateless. Alternatively, the transactions can be made stateless. When the beginning and end of a state is marked, load-balancing and fail-over mechanisms may be implemented (e.g. a rollback operation and a retransmit operation). In some embodiments of the present invention, the shift to another server in case of failure may be transparent to the application. In contrast, most existing fail-over mechanisms tend to lose the connection when the server fails and the client application is requested to issue a reconnect command.

A transaction may be divided into several elements:
1. The command—e.g. SQL statement, an RPC object, a file request, and a method to invoke.
2. The Command Parameters (optional)—Additional data that may be needed for processing the command.
3. Returned data and/or Result—data resulted from the processing and/or the completion status of the command (e.g. success, error).

According to some embodiments of the present invention, each transaction may be isolated and the inspection, load-balancing and fail-over operations may be performed in transaction granularity, namely as a set of stateless transactions. If a transaction is not completed because of failure, it is reassigned to another server. There may be more tan one buffer for receiving data from the server. In the case of large transactions, several result-buffers and parameter-buffers may be created. A large transaction may also be divided into several sub-transactions, Router 16 may use any of the known methods for load balancing. Non-limiting examples of load-balancing methods are: maintaining a watch-dog to all the servers and receiving load information periodically. The load-balancing methods may determine the heart-beat, load, performance and status of the servers.

In order to increase security, additional security keys and/or signatures may be added to the parameters and/or result-buffer pointers enabling the server software to check whether the correct (un-tampered) parameters and/or pointers are received.

Figure 2:
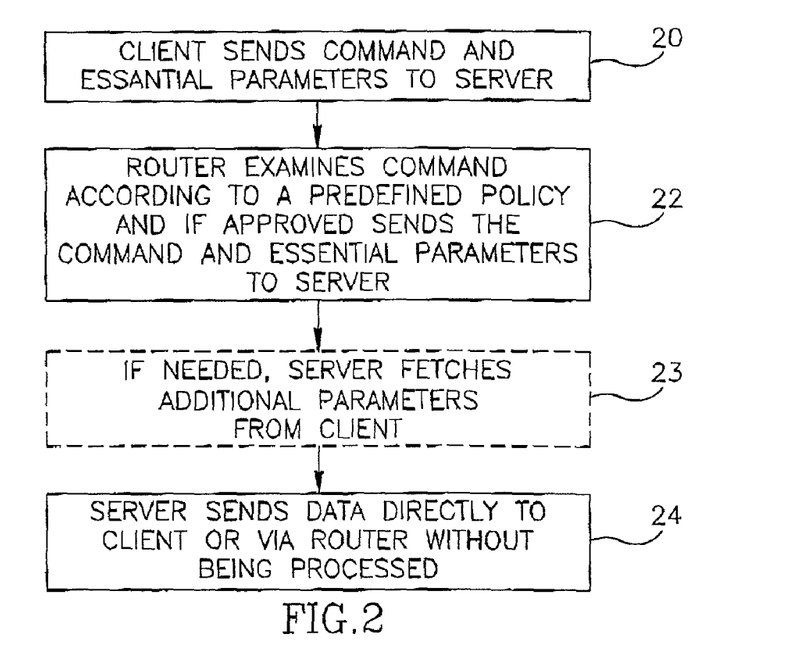
FIG. 2 is a data flow illustration of an exemplary transaction according to some embodiments of the present invention.

Reference is now made to FIG. 2, which is a data flow illustration of an exemplary transaction according to some embodiments of the present invention.

Client computer 12 may send a command to router 16 together with pointers to one or more memory buffers (step 20). In some of the transactions, client computer 12 may further send to router 16 at least one essential command-parameter. Non-limiting examples of essential command-parameters include connection request, SQL, command operation and file operation. At least one memory buffer may optionally store additional command-parameters. At least one memory buffer may store data received from server 14. When system 10 comprises more than one router 16, the application of client computer 12 may determine which of the routers is available.

Router 16 may examine the command. If the command complies with a predefined filtering policy, router 16 may look for an available server 14 (using a load-balancing scheduling algorithm). Then, router 16 may send the command and the buffers' pointers to server 14 (step 22). Server 14 may process the command and in parallel may fetch the command-parameters directly from the memory of client computer 12. The fetching process may utilize an RDMA read operation.

Once server 14 completes processing the command, it may send the result directly to the memory of client computer 12 (step 24). Alternatively, the parameters and data may travel via router 16 without being processed by it. Server 14 may utilize an RDMA write operation. Client computer 12 may be notified about the completion of the command. The client application may then receive the results, In a network based on Infiniband, VI or other RDMA-capable hardware implementations, a networking device may notify client computer 12 about the completion of the process. Alternatively, mainly in cases of software implementations, a suitable protocol may notify client computer 12 about the completion.

Router 16 may also receive the connection request from client 12 including information about the application and the target machine. The router may decide which server may handle the traffic based on a predetermined policy and on the information received in the connection request. From then until the termination of the connection, the traffic may travel directly between client 12 and server 14 or via additional routers for additional content filtering.

System 10 may be suitable for a variety of content-based applications, such as, for example, quality of service, caching and billing. Some of these content-based applications route traffic according to its content. Some gather information about the traffic. The use of system 10 may offer the advantages of improved security, fewer fail-over events, scalability, and reduced delays while maintaining the level of machine performance and CPU load as explained below. Firstly, there is no single point of failure in system 10. Secondly, client computer 12 does not directly initiate any communication to server 14. Client computer 12 may not even be aware of the address of server 14, thus eliminating the risk the client attacking the server.

Thirdly, most of the traffic travels, without delays, directly from server 14 to client 12 or via router 16 without being processed therein. The direct flow of data from server 14 to client 12 may enable maintaining an existing level of performance and load of the machine's CPU. In some cases, it may also reduce the CPU load compared to standard unsecured TCP/IP client/server communication. Furthermore, RDMA mechanisms may even increase performance.

Figure 3:
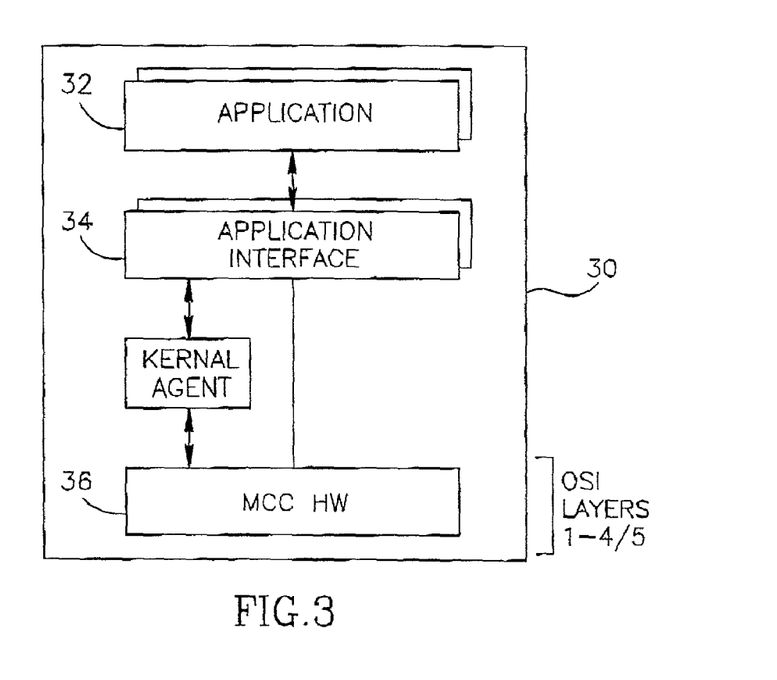
FIG. 3 is a block diagram illustration of a computer having a transaction-aware communication application according to some embodiments of the present invention.

Reference is now made to FIG. 3, which shows a computer having a transaction-aware communication application according to some embodiments of the present invention. The computer may be client 12 or server 14.

In a standard network, during communication between users, there is a flow of data through each layer at one end down through the layers in that computer and, at the other end, when the data arrives, another flow of data up through the layers in the receiving computer and ultimately to the end user. In contrast, in some embodiments of the present invention, a multi-channel reliable communication hardware may communicate directly with a transaction-aware communication application as will be explained below. In these embodiments, multi-channel reliable communication hardware may replace the standard network card. In relation to the OSI model, multi-channel reliable communication hardware may replace the lower four OSI layers and some functions of the upper OSI layers as well.

A computer 30 may comprise one or more applications 32, one or more application interfaces 34 adapted to capture the network traffic, and multi-channel communication hardware 36. Application interface 34 may be a transport provider and/or a socket application.

Computer 30 may also comprise a kernel agent 38. The term "kernel agent" refers to software elements of a kernel system that initialize the hardware elements of the kernel system. These software elements may be further adapted to allocate channels, to handle errors and the like.

Communication hardware 36 may provide special communication capabilities of transferring data reliably directly from process to process. Non-limiting examples of such communication capabilities include error detection, queuing, memory management, multiplexing and security. Therefore, there may be a significant increase in application-to-application communication performance, because these capabilities no longer need to be provided in the software part of the application-to-application communication. It should be noted that communication hardware 36 may comprise a transport communication layer implemented in hardware and may have kernel-bypassing capabilities.

Non-limiting examples of communication hardware 36 include new system area network (SAN) technology, for example virtual interfaces (VI), InfiniBand, Fiber-Channel, small computer system interface (SCSI), asynchronous transfer mode (ATM), RDMA over TCP/IP network and even expanded Ethernet.

Application interface 34 may be embedded between layers of a standard network. Alternatively, application interface 34 may replace the standard application and/or session network layers of the OSI model. Application interface 34 may also replace the socket application-programming interface (API). Non-limiting examples of API include Berkeley software distribution (BSD), Winsock, and transport data interface (TDI). The standard process of transferring a message between two computers may involve a flow of data through each layer down to the physical layer at one computer and then when the message arrives, another flow of data up though the layers in the receiving computer and ultimately to the application.

A client application interface 34 is now described. According to some embodiments of the present invention, application interface 34 may receive the transaction. The data received may include the command, the client computer address, pointers to additional parameter-buffers, and pointers to result-buffers. Application interface 34 may cache the transaction, may divide the transactions into elements, (e.g. command, parameters and returned data) and may send the command and essential parameters to router 16.

Client computer 12 may maintain the address of router 16 and in a case of overload or failure of router 16, the address may be replaced to another available router. This procedure may be performed using known load-balancing algorithms.

The actual fetch of the parameters and the transfer of the transaction results may utilize RDMA operations without the involvement of application 32 of client 12. Once the transaction is completed, application interface 34 may be notified. Application interface 34 may maintain a timer and in a case of a timeout, client 12 may try to re-send the transaction to another server. It may also be needed to notify router 16 about the failure. Only if a problem persists, client application 32 may be notified about the failure.

A server application interface 34 is now described. Server application interface 34 may be adapted to send and receive transactions directly to the hardware through operations such as Send and RDMA. Application interface 34 may be software adapted to convert the transactions and commands received in a new type protocol over technologies such as, for example, Infiniband using RDMA operations to standard applications and/or session layer interfaces of the OSI model. The conversion may be performed in a seamless manner. Non-limiting examples of such protocols include SDP, DAFS, and SRP.

Application interface 34 may also be adapted to convert transaction-parameters and the returned result and data. The interface may be an integral part of the operating system supplied by the operating system providers or may be an add-on to a standard operating system.

Figure 4:
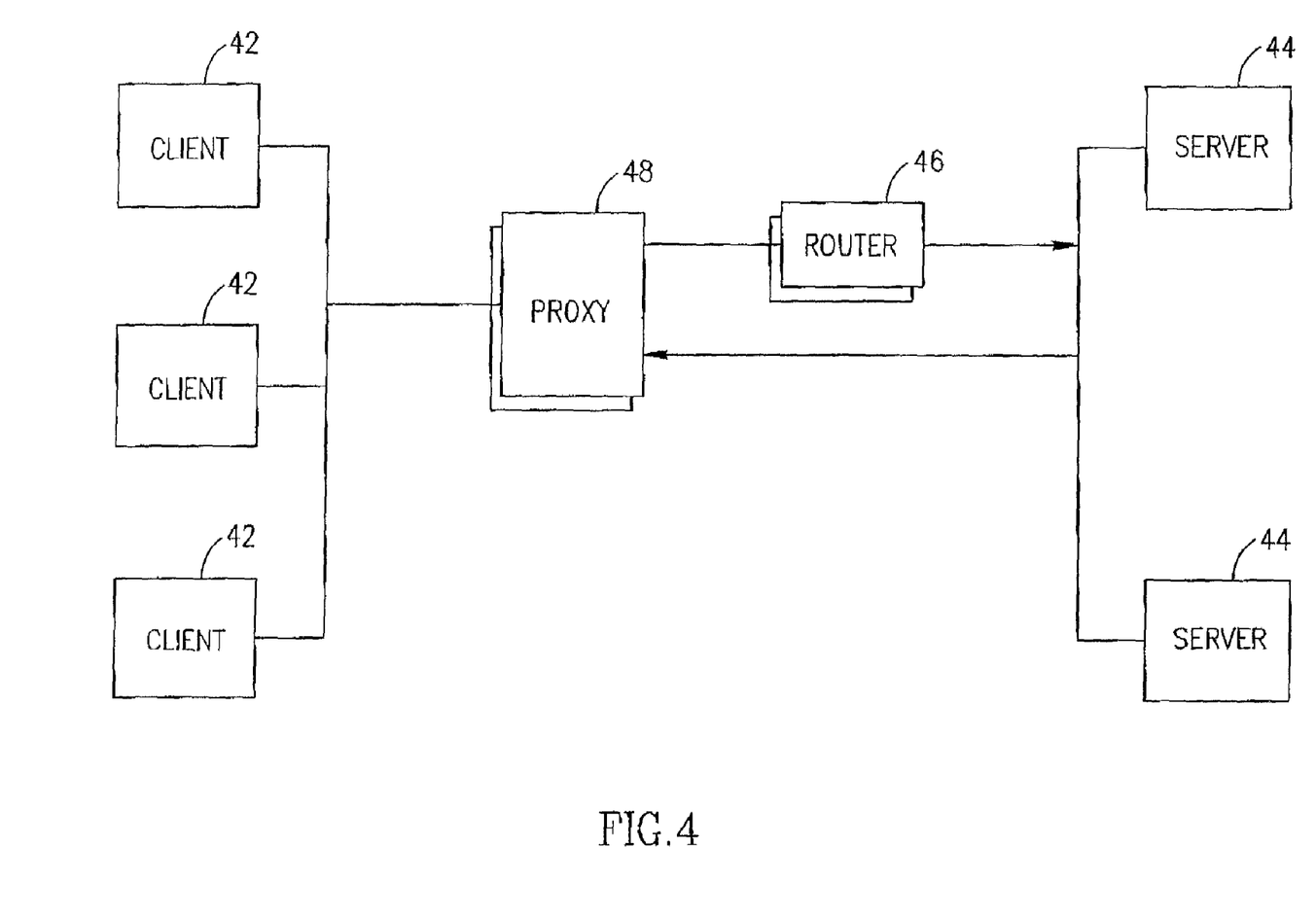
FIG. 4 is a block diagram illustation of a content filtering and load balancing system having a proxy element according to some embodiments of the present invention.

In some cases, it may not be possible to replace the client networking software and/or hardware. For example, when clients 12 are web clients and server 14 is a web server. In such cases, according to some embodiments of the present invention, a proxy element may be added between router 16 and clients 12. The proxy may collect packets provided by client 12 (e.g. TCP/IP packets) and may generate transactions instead of client 12. The proxy may also convert the result data back to packets.

Reference is now made to FIG. 4, which is a block diagram of a system for content filtering and load-balancing having a proxy element according to some embodiments of the present invention. A system 40 may comprise at least one client computer 42, at least one server computer 44 and at least one router 46 coupled to server computer 44. System 40 may further comprise one or more proxy element 48 coupled to client computer 42 and to server 46. Proxy 48 may be implemented as software, hardware, an embedded device, an electronic device and any combination thereof.

Proxy element 48 may also be integrated into router 46. Proxy element may be adapted to convert packet/frame-oriented communication (e.g. TCP/IP) to transaction-oriented communication, and/or to implement RDMA operations. There may be a need to preserve the true origin (behind the proxy) of the source. In this case, proxy 48 may add the address of client 42 to the command. On the server side the address may be forwarded to the application.

Figure 5:
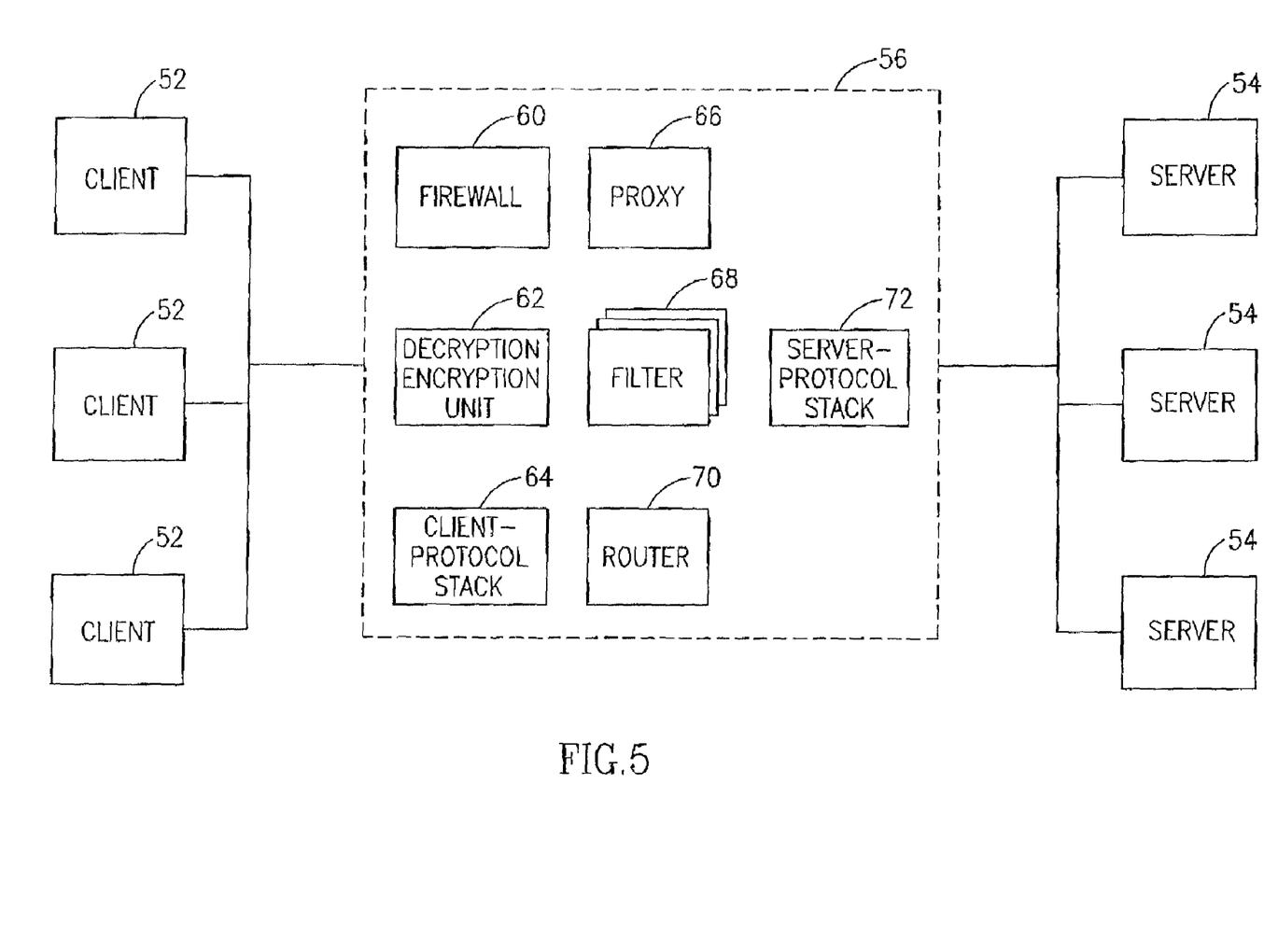
FIG. 5 is a block diagram illustration of a content filtering and load balancing system according to some embodiments of the present invention.

Reference is now made to FIG. 5, which is an illustration of a system for content filtering and load-balancing according to some embodiments of the present invention. In these embodiments, a client may be coupled to a standard TCP/IP network, while a server may comprise advanced networking hardware and/or software that have RDMA capabilities (e.g. VI, Infiniband, iSCSI, and TCP/IP with RDMA capabilities).

A system 50 may comprise a gateway 56 coupled to at least one server 54 and to a least one client 52. Gateway 56 may comprise both a proxy element and a router and may be adapted to maintain the performance, reliability and offloading benefits of a server farm network while maintaining compliance with the clients' applications and allowing seamless integration. Gateway 56 may be further adapted to add security, content filtering, load balancing, quality of service, accounting, and caching capabilities. Gateway 56 may comprise software packages, embedded devices, electronic devices, and any combination thereof. Gateway 56 may be implemented in more than one machine in any combination. For example, there may be more than one gateway in parallel to allow more availability and increase bandwidth. Additionally, there may be several cascaded gateways in order to add content-based filtering functions such as, for example, security, accounting, quality of service and caching.

Gateway 56 may comprise a firewall 60, a decryption/encryption unit 62, and a client-protocol stack 64. Firewall 60 may be a network security unit implemented in software, hardware or any combination thereof. Firewall 60 may be a standard element, which may be adapted to control which network resources (ports) may access gateway 56. If the communication provided to gateway 56 is encrypted and/or authenticated (e.g. IP Sec, SSL, and SET), gateway 56 may have the capabilities to decrypt data. Decryption/encryption unit 62 may be adapted to decrypt information before passing it to the next station. In order to boost performance decryption/encryption unit 62 may be implemented fully or partially in hardware.

Client-protocol stack 64 may be for example, a TCP/IP protocol stack. In such a case, protocol stack 64 may be responsible for transforming TCP/IP packets to a reliable session. In order to boost performance, client-protocol stack 64 may be implemented fully or partially in hardware.

Gateway 56 may further comprise a proxy element 66, one or more application-level content filtering filters 68 and a router 70. Proxy element 66 may be adapted to respond to clients 52 as if it is server 54. Proxy element 66 may be adapted to cache the incoming/outgoing data and to form a complete transaction. Proxy 66 may also be enhanced to serve as a cache for servers 54 and to store answers to transactions. When proxy 66 receive a command that match one of the commands stored in its cache, proxy 66 may instantly return the data without having to transfer the command to server 54. For example, in case of a web server, a picture database may be stored in the cache of proxy 66. When a user requests a picture that is stored in the cache, the picture may be provided to that user via client 12 without requesting it from the actual web server.

Application-level security filter 68 may be adapted to filter the transactions based on a predefined security policy. Router 70 may be adapted to determine which server to send the command to, base on the server's availability and load. Gateway 56 may further comprise a server-protocol stack 72. Server-protocol stack 72 may be adapted to maintain connection with server 54 using efficient operations (e.g. RDMA). In Infiniband, VI and other new standards, server-protocol stack 72 may be a thin user mode software layer that communicates directly with the hardware. Tunneling over a TCP/IP protocol stack may also be used for load-balancing and/or content filtering without improving performance.

The table below describes non-limiting examples of transactions divided to several elements according to some embodiments of the present invention. The transactions may also be divided in a different manner.

| Service | Command and Essential Parameters | Additional Parameters | Result |
| --- | --- | --- | --- |
| HTTP | HTTP request | | Web page |
| FTP/NFS read file | File name and path | | File |
| FTP/NFS write file | File name and path | File | Returned status (Success/Error) |
| Database SQL Select | SQL statement | | Row Set |
| Database SQL Update | SQL statement | Updated field/s data | Returned status |
| RPC | Object/Class + Method | Additional parameters | Returned Data/Status |
| Multimedia | Requested media object | | Multimedia stream |
| Sockets | control information connection information | Buffers to read | Buffers to write |
| Storage | SCSI commands | Additional parameters or data to write | Returned Data blocks and status |

While certain features of the invention have been illustrated and described herein, manly modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for transaction-oriented communication between a client computer and one or more server computers, the client computer and the server computers having multi-channel reliable network hardware, the method comprising:
    monitoring network traffic over a connection between said client computer and said one or more server computers, wherein said network traffic includes at least one transaction initiated by said client computer, the transaction including a command portion and a data portion;
    based on a predefined policy, directing one of said server computers to directly transfer the data portion of said transaction to said client computer over said connection using remote direct memory access messages; and
    processing the command portion of said transaction via a router on said connection between the client computer and said one or more server computers.

2. The method of claim 1, comprising processing said network traffic within or above a transport layer only.

3. The method of claim 1, further comprising:
    filtering said network traffic according to said predefined policy.

4. The method of claim 1, further comprising:
    gathering information on said network traffic.

5. The method of claim 1, further comprising:
    selecting one of said server computers to receive said transaction according to information in said network traffic.

6. The method of claim 1, further comprising:
    selecting one of said server computers to receive said transaction according to load-balancing considerations.

7. A method for transaction-oriented communication between a client computer and one or more server computers having multi-channel reliable network hardware, the method comprising:
    monitoring a session of packet-oriented network traffic between the client computer and said one or more server computers;
    isolating at least one transaction from said packet-oriented network traffic, the transaction including a command portion and a data portion;
    sending said command portion to one of said server computers for processing; and
    converting said data portion to allow access to data of the transaction using remote direct memory access messages that are compatible with said multi-channel reliable network hardware.

8. The method of claim 7, wherein said packet-oriented network traffic is transport control protocol traffic.

9. The method of claim 7, wherein isolating at least one transaction comprises:
    collecting packets of said session of packet-oriented network traffic; and
    marking a beginning and end of a state of said session to generate one or more stateless transactions each including a command portion and a data portion.

10. The method of claim 7, further comprising:
    filtering said network traffic according to a predefined policy.

11. The method of claim 7, further comprising:
    gathering information about said network traffic according to a predefined policy.

12. The method of claim 7, further comprising:
    routing said transactions according to information in said network traffic.

13. The method of claim 7, further comprising:
    routing said transactions according to load-balancing considerations.

14. A system for transaction-oriented communication between a client computer and one or more server computers having multi-channel reliable network hardware, the system comprising:
    a proxy able to monitor a session of packet-oriented network traffic between the client computer and said one or more server computers, to isolate at least one transaction from said packet-oriented network traffic, the transaction including a command portion and a data portion, and to convert said data portion to allow access to data of the transaction using remote direct memory access messages that are compatible with said multi-channel reliable network hardware; and
    one or more routers to send said command portion to one of said server computers for processing.

15. The system of claim 14, wherein said packet-oriented network traffic is transport control protocol traffic.

16. The system of claim 14, wherein said one or more routers are able to process said transactions within or above a transport layer only.

17. The system of claim 16, wherein one or more of said routers is able to direct said transactions among said server computers according to information in said transactions.

18. The system of claim 16, wherein one or more of said routers is able to direct said transactions among said routers according to information in said transactions.

19. The system of claim 16, wherein one or more of said routers is able to direct said transactions among said server computers according to load-balancing considerations.

20. The system of claim 16, wherein one or more of said routers is able to direct said transactions among said routers according to load-balancing considerations.

21. The system of claim 16, wherein one or more of said routers is able to filter said transactions according to a predefined policy.

22. The system of claim 16, wherein one or more of said routers is able to gather information on said transactions.

23. The system of claim 14, wherein said multi-channel reliable network hardware is selected from a group including: virtual interface hardware, Infiniband hardware, Fiber-Channel hardware, small computer system interface hardware, asynchronous transfer mode hardware, expanded Ethernet hardware, and remote direct memory access over transport control protocol over internet protocol network hardware.

24. The system of claim 14, wherein said transactions are from a group including: database transactions, remote procedure call transactions, storage-access transactions, file-access transactions, and socket transactions.

25. A system for transaction-oriented communication between a client computer and one or more server computers, the client computer and the server computers having multichannel reliable network hardware, the system comprising:
    one or more routers to monitor network traffic over a connection between said client computer and said one or more server computers, wherein said network traffic includes at least one transaction initiated by said client computer, the transaction including a command portion and a data portion, wherein said one or more routers are able to process the command portion of said transaction, and, based on a predefined policy, to direct one of said server computers to directly transfer the data portion of said transaction to said client computer over said connection using remote direct memory access messages.

26. The system of claim 25, wherein said one or more routers are able to process said network traffic within or above a transport layer only.

27. The system of claim 25, wherein said one or more routers are able to filter said network traffic according to said predefined policy.

28. The system of claim 25, wherein said one or more routers are able to gather information on said network traffic.

29. The system of claim 25, wherein said one or more routers are to select one of said server computers to receive said transaction according to information in said network traffic.

30. The system of claim 25, wherein said one or more routers are to select one of said server computers to receive said transaction according to load-balancing considerations.

31. The system of claim 25, wherein said multi-channel reliable network hardware is selected from a group including: virtual interface hardware, Infiniband hardware, Fiber-Channel hardware, small computer system interface hardware, asynchronous transfer mode hardware, expanded Ethernet hardware, and remote direct memory access over transport control protocol over internet protocol network hardware.

32. The system of claim 25, wherein said transactions are from a group including: database transactions, remote procedure call transactions, storage-access transactions, file-access transactions, and socket transactions.

* * * * *